United States Patent
Aronstam et al.

(10) Patent No.: US 9,721,710 B2
(45) Date of Patent: Aug. 1, 2017

(54) AXIAL MAGNETIC SUSPENSION

(71) Applicants: Peter S. Aronstam, Houston, TX (US); Roger W. Fincher, Conroe, TX (US)

(72) Inventors: Peter S. Aronstam, Houston, TX (US); Roger W. Fincher, Conroe, TX (US)

(*) Notice: Subject to any disclaimer, the term of this patent is extended or adjusted under 35 U.S.C. 154(b) by 299 days.

(21) Appl. No.: 14/455,134

(22) Filed: Aug. 8, 2014

(65) Prior Publication Data

US 2014/0347152 A1   Nov. 27, 2014

Related U.S. Application Data (63) Continuation of application No. 13/163,136, filed on Jun. 17, 2011, now Pat. No. 8,803,392.

(60) Provisional application No. 61/356,572, filed on Jun. 19, 2010.

(51) Int. Cl.
  *H01F 7/02* (2006.01)
  *F16C 32/04* (2006.01)
  *F16C 39/06* (2006.01)

(52) U.S. Cl.
  CPC ....... *H01F 7/0236* (2013.01); *F16C 32/0427* (2013.01); *F16C 39/063* (2013.01); *F16C 2240/12* (2013.01); *F16C 2360/23* (2013.01)

(58) Field of Classification Search
  CPC .................................................... H02K 7/09
  USPC ........................................................ 310/90.5
  See application file for complete search history.

(56) References Cited

U.S. PATENT DOCUMENTS

| | | | | |
|---|---|---|---|---|
| 2,747,944 A | * | 5/1956 | Baermann | F16C 32/0425 310/90.5 |
| 5,789,837 A | * | 8/1998 | Shin | F16C 32/0438 310/114 |
| 7,105,967 B2 | * | 9/2006 | Huang | F04D 29/057 310/90.5 |
| 2011/0291507 A1 | * | 12/2011 | Post | F16C 32/0427 310/90.5 |

* cited by examiner

*Primary Examiner* — Naishadh Desai
(74) *Attorney, Agent, or Firm* — Clayton, McKay & Bailey PC (57) ABSTRACT

The present invention generally relates to an apparatus and method for axially supporting a shaft. In one aspect, a magnetic suspension system for supporting a shaft in a housing is provided. The magnetic suspension system includes an array of magnet members disposed between the shaft and the housing. The array of magnet members comprising a first magnet member, a second magnet member, and a third magnet member, wherein the first magnet member and the second magnet member generate a first force that is substantially parallel to a longitudinal axis of the shaft and the second magnet member and the third magnet member generate a second force that is substantially parallel with the longitudinal axis of the shaft The first force and the second force are configured to position the shaft axially within the housing. In another aspect, a method of supporting a shaft along a longitudinal axis of a housing is provided. In a further aspect, a suspension system for supporting a shaft in a housing is provided.

13 Claims, 8 Drawing Sheets

AXIAL MAGNETIC SUSPENSION

CROSS-REFERENCE TO RELATED APPLICATIONS

This patent application is a continuation of U.S. patent application Ser. No. 13/163,136 ("Axial Magnetic Suspension"), filed Jun. 17, 2011, which claims priority to U.S. provisional patent application No. 61/356,572, filed Jun. 19, 2010, both of which are incorporated herein by reference and to which this application claims benefit of priority.

BACKGROUND OF THE INVENTION

Field of the Invention

Embodiments of the present invention generally relate to the support of machinery. More particularly, the invention relates to an apparatus and method for axially supporting a shaft or other mass that is laterally supported.

Description of the Related Art

Figure 1:
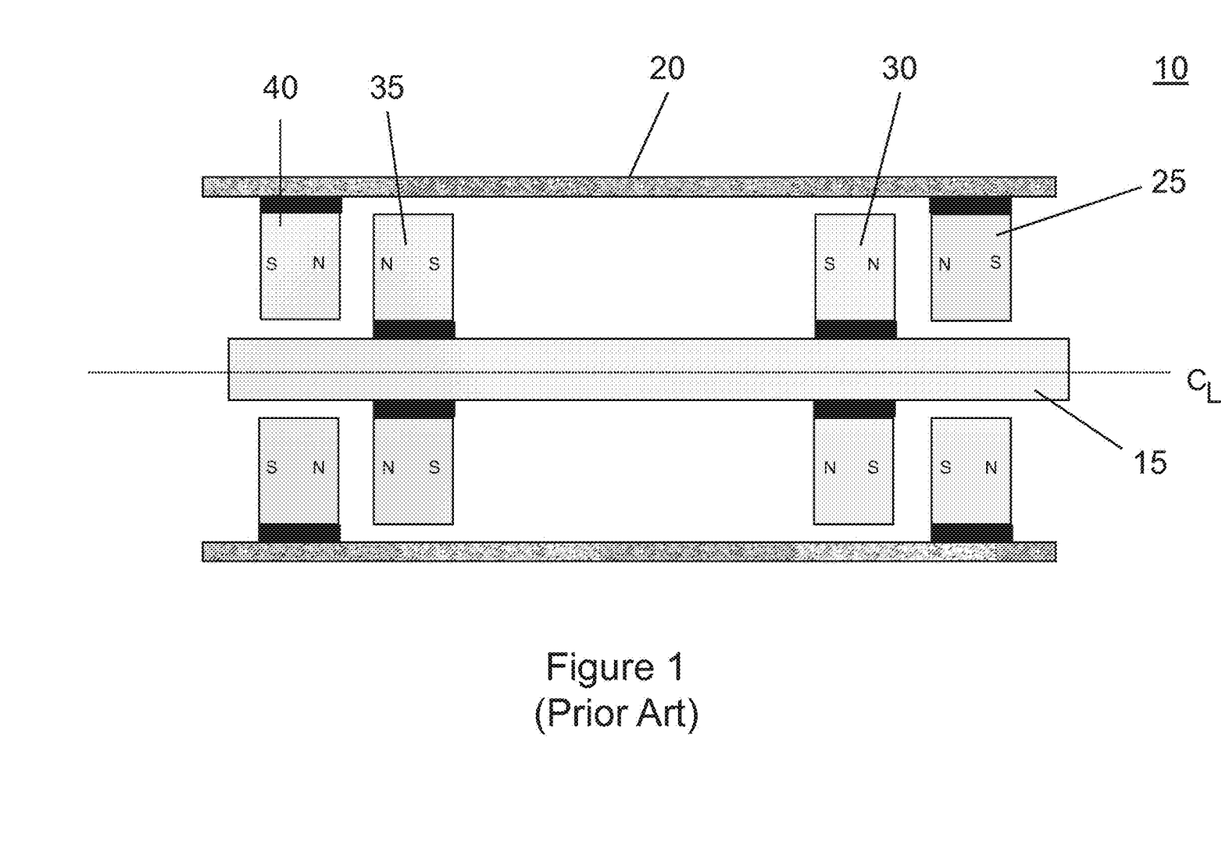
FIG. 1 is a view illustrating a conventional magnetic suspension assembly known in the art.

A conventional magnetic suspension assembly is based on the repulsive force which exists between two similar magnetic poles. An example of a conventional magnetic suspension assembly is illustrated in FIG. 1. As shown, the conventional magnetic suspension assembly 10 includes a shaft 15 disposed within a housing 20. As illustrated, a first pair of opposing magnets 25, 30 is positioned on one end of the rotating shaft 15 and a second pair of opposing magnets 35, 40 at another end of the rotating shaft 15, suspending the shaft 15. Note that radial support must be provided by other means to prevent lateral movement and cocking of the suspended structure. This radial support can be provided by several means including conventional bearings or bushings.

As greater and greater loads are placed on the suspended structure, it becomes necessary to increase the magnetic field strength. This can be accomplished by increasing the volume of magnetic material through either increasing the size or adding duplicate pairs of magnets (e.g., magnets 25, 30). Due to structural and form factor machine constraints, it is often not possible to increase the face surface area of the magnets, but rather the depth or thickness must be increased. This is only possible until the thickness is on the order of the face width as further magnetic material added is further away from the active face and is decreased by 1/R. As this limit is approached, one must add additional magnetic pairs. There is a need for a more efficient use of magnetic material to create the increased strength with balance.

SUMMARY OF THE INVENTION

The present invention generally relates to an apparatus and method for axially supporting a shaft. In one aspect, a magnetic suspension system for supporting a shaft in a housing is provided. The magnetic suspension system includes an array of magnet members disposed between the shaft and the housing. The array of magnet members comprising a first magnet member, a second magnet member, and a third magnet member, wherein the first magnet member and the second magnet member generate a first force that is substantially parallel to a longitudinal axis of the shaft and the second magnet member and the third magnet member generate a second force that is substantially parallel with the longitudinal axis of the shaft The first force and the second force are configured to position the shaft axially within the housing.

In another aspect, a method of supporting a shaft along a longitudinal axis of a housing is provided. The method includes the step of selecting an axial position of the shaft within the housing. The method further includes the step of selecting an array of magnet members based upon the selected axial position. Additionally, the method includes the step of positioning the array of magnet members between the shaft and the housing such that a first force and a second force are generated in the array of magnet members which is configured to position the shaft at the axial position within the housing.

In a further aspect, a suspension system for supporting a shaft in a housing is provided. The system includes a first array of magnet members disposed between the shaft and the housing at one end of the shaft. The system further includes a second array of magnet members disposed between the shaft and the housing at another end of the shaft, wherein the first array of magnet member generates first and second forces and the second array of magnet members generates third and fourth forces and wherein the forces are configured to position the shaft axially within the housing.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention is generally directed to a suspension assembly which can be selected based upon desired design parameters. The suspension assembly will be described herein in relation to rotating machinery, such as turbines. It is to be understood, however, that the suspension assembly may also be used for other types of machinery without departing from principles of the present invention and that shaft or housing rotation is not required. Vertical support of variable load masses is also to be considered part of the present invention. Additionally, the suspension system will be described in relation to members that are made from magnetic materials. It is to be understood, however, that the members may be made from other materials that are configured to generate forces on adjacent members. To better understand the novelty of the suspension assembly of the present invention and the methods of use thereof, reference is hereafter made to the accompanying drawings. The present invention depicts the use of permanent magnets, however the present invention can also use electromagnets or a combination of permanent and electromagnets. The combination of electromagnets allows for controlled axial positioning with variable loading.

Figure 2:
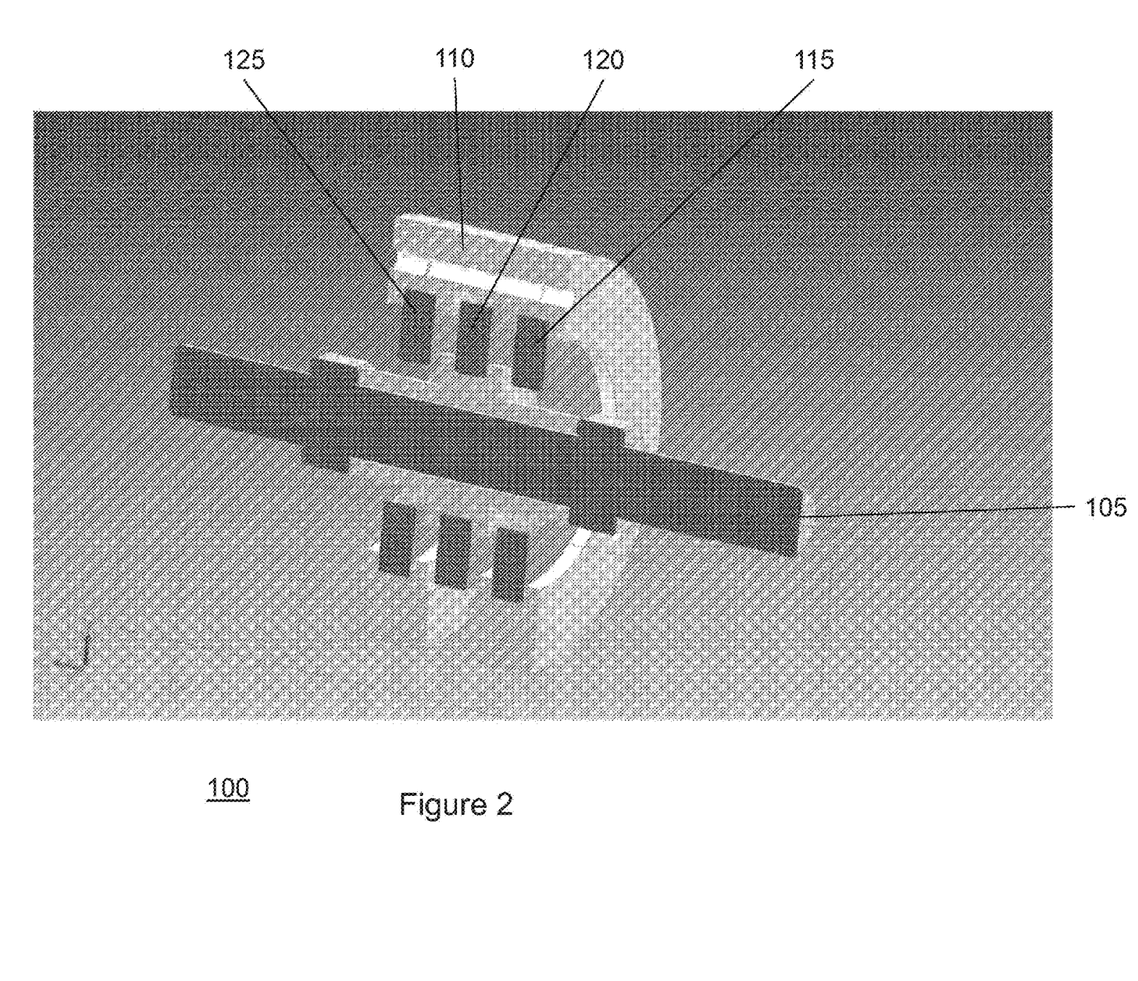
FIG. 2 is a view illustrating a magnetic suspension assembly of the present invention.

FIG. 2 is a view illustrating a magnetic suspension assembly 100 of the present invention. The assembly 100 includes a shaft 105 disposed within a housing 110. The shaft 105 is configured to rotate relative to the housing 110. The shaft 105 is radially supported by bearings (not shown). The shaft 105 is also configured to move axially relative to the housing 110. As will be described herein, the shaft 105 is axially supported by a plurality of magnet members. The magnet members may be selected and arranged to achieve a desired design parameter. For instance, the magnet members may be selected and arranged such that the shaft is automatically centralized in the housing as set forth in the embodiment shown in FIGS. 3-5. Further, the magnet members may be selected and arranged such that the shaft requires an axial load to be centralized in the housing as set forth in the embodiment shown in FIGS. 6 and 7. Furthermore, the magnet members may be selected and arranged such that the shaft is automatically offset in the housing as set forth in the embodiment shown in FIGS. 8 and 9. In other words, magnetic directions, strength and face to face spacing would be chosen to yield the desired response of the shaft.

As shown in FIG. 2, the magnetic suspension assembly 100 includes an array of magnet members comprising a first magnet member 115, a second magnet member 120 and a third magnet member 125. The first magnet member 115 and the third magnet member 125 are attached to the housing 110, and the second magnet member is attached to the shaft 105. In an alternative embodiment, the first magnet member 115 and the third magnet member 125 are attached to the shaft 105, and the second magnet member is attached to the housing 110. As shown, the second magnet member 120 is disposed between the first magnet member 115 and the third magnet member 125. The polarity of the magnet members 115, 120, 125 is arranged such that the second magnet member 120 is centralized between the first magnet member 115 and the third magnet member 125. The magnet members 115, 120, 125 are shown as rings with a rectangular cross-section. It should be understood, however, that the magnet members 115, 120, 125 may have any geometrical shape and cross-section, without departing from principles of the present invention and that centralized spacing is not required.

As shown in FIG. 2, the magnet member 120 attached to the shaft 105 is surrounded on both sides by magnet members 115, 125 which are fixed in the housing 110. In the case where adjacent magnet members generate repulsive forces, the magnet member 120 and shaft 105 will be suspended in an axial sense.

Figure 3:
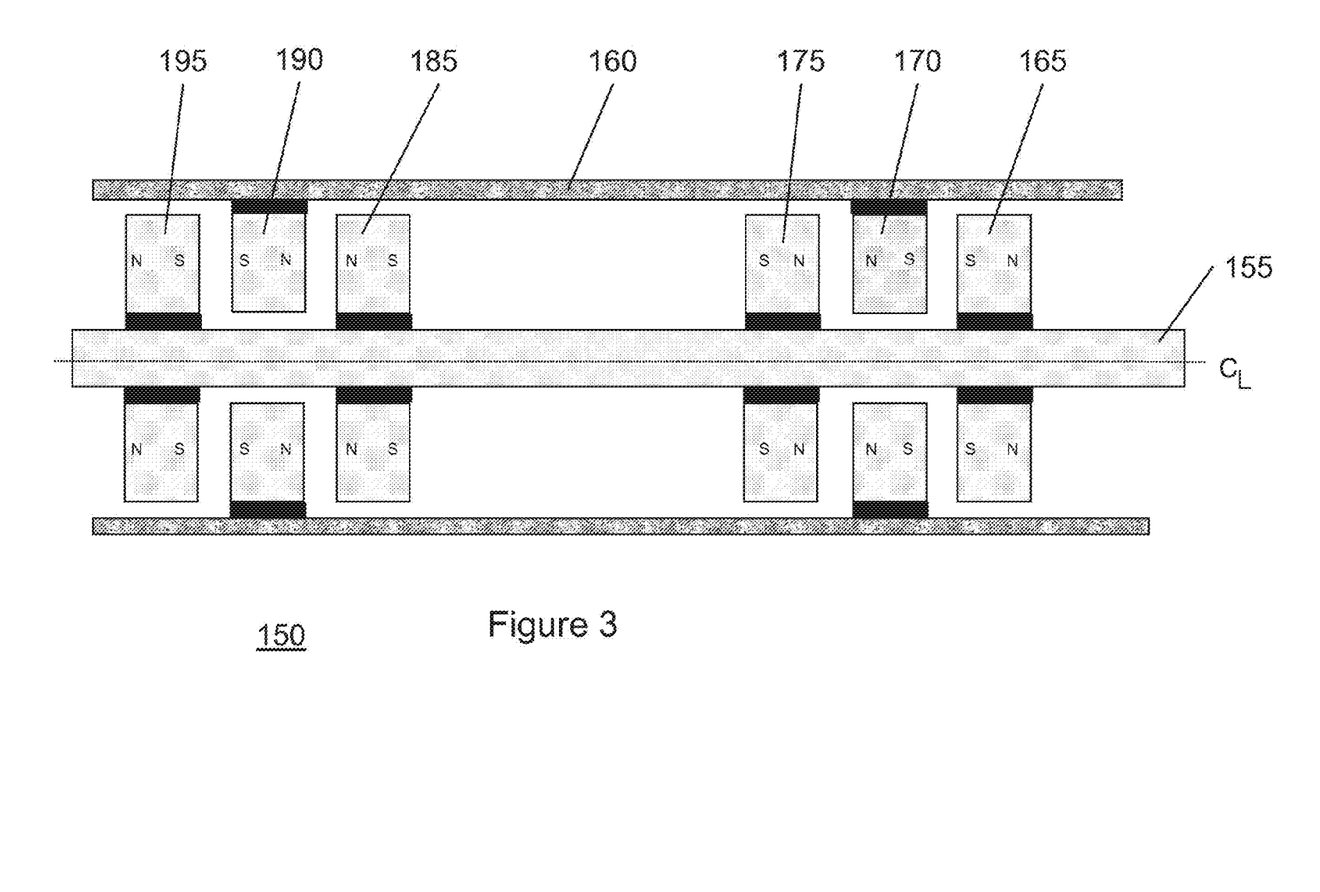
FIG. 3 is a view illustrating a magnetic suspension assembly.

FIG. 3 is a view illustrating a magnetic suspension assembly 150 of the present invention. As shown, the assembly 150 includes a first array of magnet members comprising first, second and third magnet members 165, 170, 175 on one side of the shaft 155 and a second array of magnet members comprising fourth, fifth and sixth magnet members 185, 190, 195 on the other side of the shaft 155. The shaft 155 is configured to rotate relative to a housing 160. The shaft 155 is radially supported by bearings (not shown) and axially supported by the magnet members 165, 170, 175, 185, 190, 195. As shown, the magnet members 170, 190 are attached to the housing 160, and the magnet members 165, 175 are attached to the shaft 155. In another embodiment, the magnet members 170, 190 are attached to the shaft 155, and the magnet members 165, 175 are attached to the housing 160.

A north magnetic pole (N) and a south magnetic pole (S) are shown in each magnet member. The magnet members are arranged such that the magnetic poles for adjacent magnet members are the same. For instance, the south magnetic pole of the first magnet member 165 is facing the south magnetic pole of the second magnet member 170, and as such a repulsive force is generated between the first and second magnet members 165, 170. As illustrated, a similar arrangement is between the other magnet members in the magnetic suspension assembly 150. In other words, the center magnet member (e.g., the second magnet member 170 and the fifth magnet member 190) is effectively held in balance between the repulsive forces of the outer magnet members.

One aspect of the magnet arrays is a more efficient use of magnetic material to create the increased strength with balance. As shown in FIG. 3, by adding a third magnet member but in a reverse sense, the center magnet member is effectively held in balance between the repulsive forces of the outer magnet members. By placing a second magnet member array that is balanced by magnet members at the opposite end of the shaft, one can create a stable balanced system with twice the strength of using only six magnet members.

Figure 4:
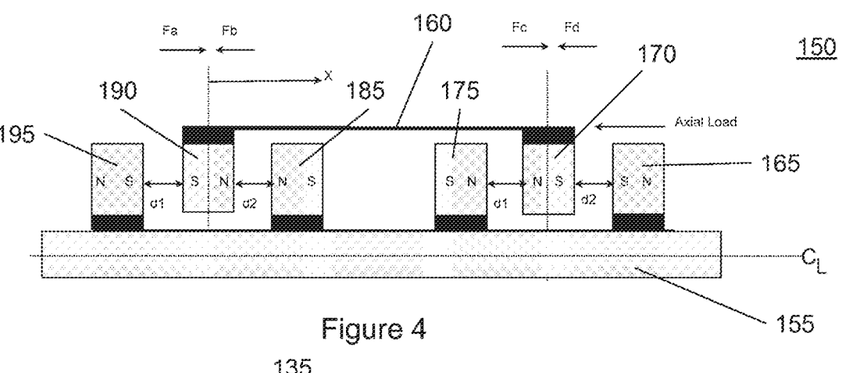
FIG. 4 is a view illustrating a force diagram in the magnetic suspension assembly shown in FIG. 3.

FIG. 4 is a view illustrating a force diagram in the magnetic suspension assembly 150. As shown, repulsive forces (Fa and Fb) are applied to the fifth magnetic 190 by the fourth magnet member 185 and the sixth magnet member 195. Repulsive forces (Fc and Fd) are applied to the second magnet member 170 by the first magnet member 165 and the third magnet member 175.

Figure 5:
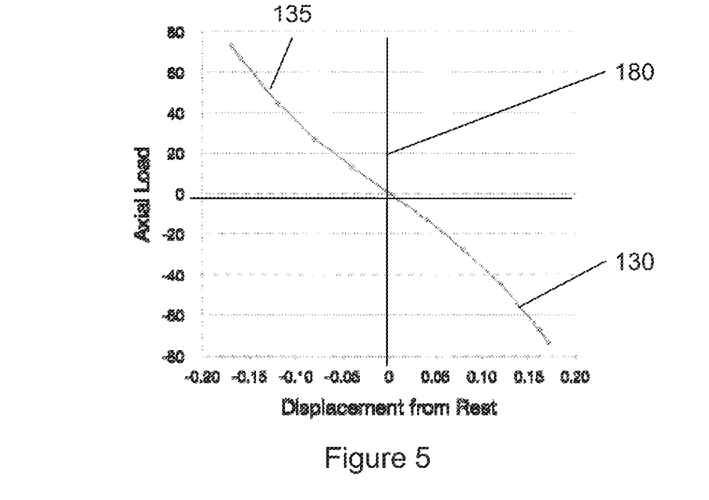
FIG. 5 is a graph that illustrates a displacement from rest based upon an axial load applied to a shaft of the magnetic suspension assembly shown in FIG. 4.
Figure 6:
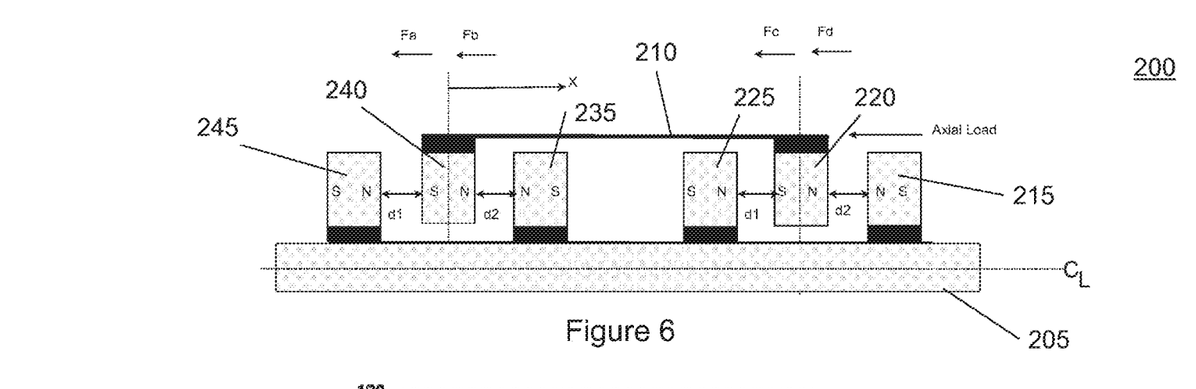
FIG. 6 is a view illustrating a force diagram of a magnetic suspension assembly.

Initial Conditions: d1=d2=S
Axial Load=Fa−Fb+Fc−Fd
Axial Load=2Fa−2Fb due to symmetry and
d1=S+X
d2=S−X
Note: Positive X is to the Right FIG. 5 is a graph that illustrates the displacement from rest based upon an axial load applied to the shaft 155. Line 180 illustrates the shaft 155 at rest when no axial load is applied to the shaft 155. As illustrated, the shaft 155 is centralized in a stable balanced system with 0 axial load and 0 displacement. The stable balanced system occurs when d1=d2 and the magnet members 165, 170, 175, 185, 190, 195 have the same magnetic strength due to similar volume, internal composition and density of magnetic material. An axial load may be applied to the shaft 155, which results in the shaft 155 being moved (or displaced) from the centralized position. For example, an axial load of approximately 55 pounds applied to the shaft 155 results in a displacement of approximately 0.12 inches in the −X direction (see point 135). In another example, an axial load (in direction opposite the axial load arrow) of approximately 50 pounds applied to the shaft 155 will result in a displacement of approximately 0.08 inches in the +X direction (see point 130). The embodiment shown in the FIGS. 4-6 illustrates a balanced suspension system. In one embodiment, using individual magnet members of approximately 40 pounds force repulsion, it is possible to create a balanced suspension system with approximately 80 peak load capacity.

FIG. 6 is a view illustrating a force diagram of a magnetic suspension assembly 200. As shown, the assembly 200 includes a first array of magnet members comprising first, second and third magnet members 215, 220, 225 on one side of the shaft 205 and a second array of magnet members comprising fourth, fifth and sixth magnet members 235, 240, 245 on the other side. The shaft 205 is configured to rotate relative to a housing 210. The shaft 205 is radially supported by bearings (not shown) and axially supported by the magnet members 215, 220, 225, 235, 240, 245. As shown, the magnet members 220, 240 are attached to the housing 210 and the magnet members 235, 245 are attached to the shaft 205. In another embodiment, the magnet members 220, 240 are attached to the shaft 205, and the magnet members 235, 245 are attached to the housing 210.

The magnet members are arranged such that some magnetic poles for adjacent magnet members are the same and some magnetic poles for adjacent magnet members are different. For instance, the north magnetic pole of the first magnet member 215 is facing the north magnetic pole of the second magnet member 220, and as such a repulsive force is generated between the first and second magnet members 215, 220. Additionally, the south magnetic pole of the second magnet member 220 is facing the north magnetic pole of the third magnet member 225, and as such an attractive force is generated between the first and second magnet members 215, 220. A similar arrangement is between the fourth, fifth and sixth magnet members 235, 240, 245. The center magnet member (e.g., the second magnet member 220 and the fifth magnet member 240) is being repulsed by some magnet members and attracted by other magnet members in the same direction.

As shown in FIG. 6, forces (Fa and Fb) are applied to the fifth magnetic 240 by the fourth magnet member 235 and the sixth magnet member 245. Forces (Fc and Fd) are applied to the second magnetic 220 by the first magnet member 215 and the third magnet member 225.

Figure 7:
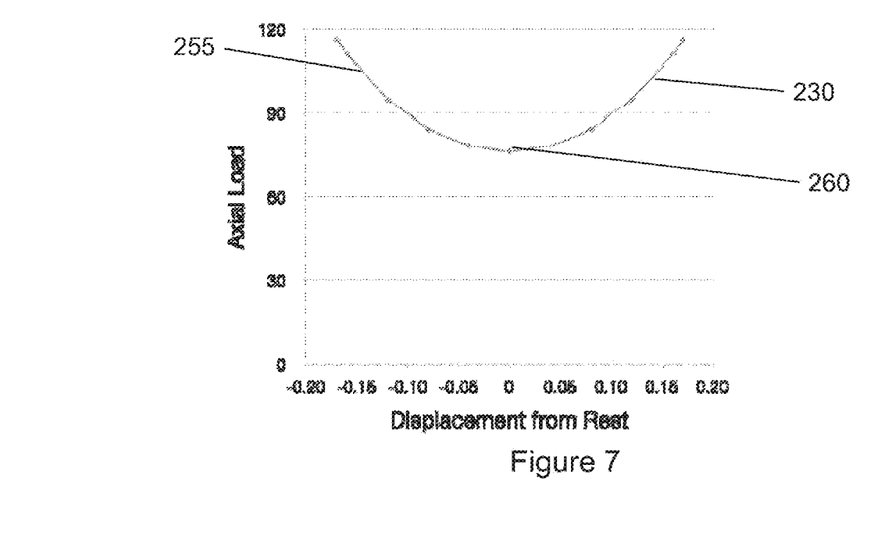
FIG. 7 is a graph that illustrates the displacement from rest based upon an axial load applied to a shaft of the magnetic suspension assembly shown in FIG. 6.

Axial Load=Fa+Fb+Fc+Fd
Axial Load=2Fa+2Fb due to symmetry
Note: Positive X is to the Right FIG. 7 is a graph that illustrates the displacement from rest based upon an axial load applied to the shaft 205. As illustrated, the shaft 205 is at point 260 (e.g., 0 displacement) when an applied axial load of approximately 75 pounds is applied to the shaft 205. In other words, an axial load must be applied to the shaft 205 to position the shaft 205 at the point 260. A symmetric arrangement around the point 260 occurs when the magnet members 215, 220, 225, 235, 240, 245 have the same magnetic strength due to similar volume, internal composition and density of magnetic material. For example, the shaft 205 having a 0.12 displacement in the +X direction requires an axial force of approximately 95 pounds (see point 230) and the shaft having a 0.12 displacement in the −X direction requires an axial force of approximately 95 pounds (see point 255). Thus, the magnetic suspension assembly 200 has the same performance in the −X direction and +X direction for the same displacement relative to the point 260. In this manner, the magnetic suspension assembly 200 can be configured to require a minimum load for first movement, but has equal force displacement relationship in either direction.

Figure 8:
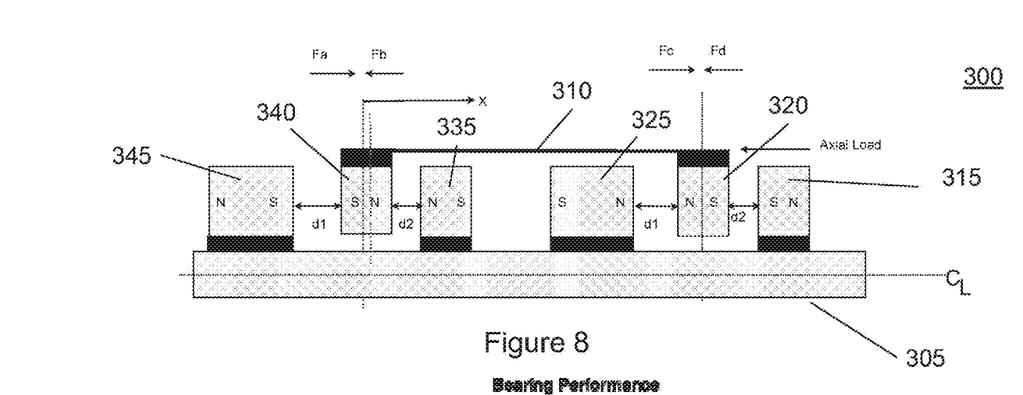
FIG. 8 is a view illustrating a force diagram of a magnetic suspension assembly.

FIG. 8 is a view illustrating a force diagram of a magnetic suspension assembly 300 of the present invention. The magnetic suspension assembly 300 is configured to have an asymmetric mechanical response. As shown, the assembly 300 includes a first array of magnet members comprising first, second and third magnet members 315, 320, 325 on one side of the shaft 305 and a second array of magnet members comprising fourth, fifth and sixth magnet members 335, 340, 345 on the other side. The shaft 305 is configured to rotate relative to a housing 310. The shaft 305 is radially supported by bearings (not shown) and axially supported by the magnet members 315, 320, 325, 335, 340, 345. As shown, the magnet members 320, 340 are attached to the housing 310, and the magnet members 315, 325, 335, 345 are attached to the shaft 305. In another embodiment, the magnet members 320, 340 are attached to the shaft 305, and the magnet members 315, 325, 335, 345 are attached to the housing 310.

The magnet members 315, 320, 325, 335, 340, 345 are arranged such that the magnetic poles for adjacent magnet members are the same. Thus, repulsive forces (Fa and Fb) are applied to the fifth magnet member 340 by the fourth magnet member 335 and the sixth magnet member 345, and repulsive forces (Fc and Fd) are applied to the second magnet member 320 by the first magnet member 315 and the third magnet member 325. As illustrated, the third magnet member 325 and the sixth magnet member 345 are larger than the other magnet members and therefore have a larger magnetic strength. In one embodiment, the third magnet member 325 and the sixth magnet member 345 are twice as large as the other magnet members.

Axial Load=Fa−Fb+Fc−Fd
Axial Load=2Fa−2Fb due to symmetry
d1=S+X
d2=S−X
Note: Positive X is to the Right The distance d1 between same-sized magnet members (e.g., first magnet member 315 and second magnet member 320) is not equal to the distance d2 between different-sized magnet members (e.g., second magnet member 320 and third magnet member 325) due to unequal strength of the magnet members. In another embodiment, the first magnet member 315 and the fourth magnet member 335 are larger than the other magnet members and therefore have a larger magnetic strength.

The magnetic suspension assembly 300 with the asymmetric mechanical response can be accomplished by varying the magnetic strength of specific magnet members in the magnetic suspension assembly 300. This can be accomplished by increasing the volume of the magnet member, by changing its internal composition, or density of magnetic material. As shown FIGS. 8 and 9, by doubling the strength of the leftmost lead magnet member (e.g., magnet members 325, 345) on both sides of the shaft 305, the load force can be increased in one direction but not the reverse. In this example, the device can support loads up to 120 pounds in the −X direction and only 75 pounds in the +X direction. This feature can be very useful in applications where the load is asymmetric or where the weight of the structure must be added to the dynamic loads expected. Indeed, by varying the various magnetic components and their relative spacing, the suspension can be fine-tuned for a specific application.

Figure 9:
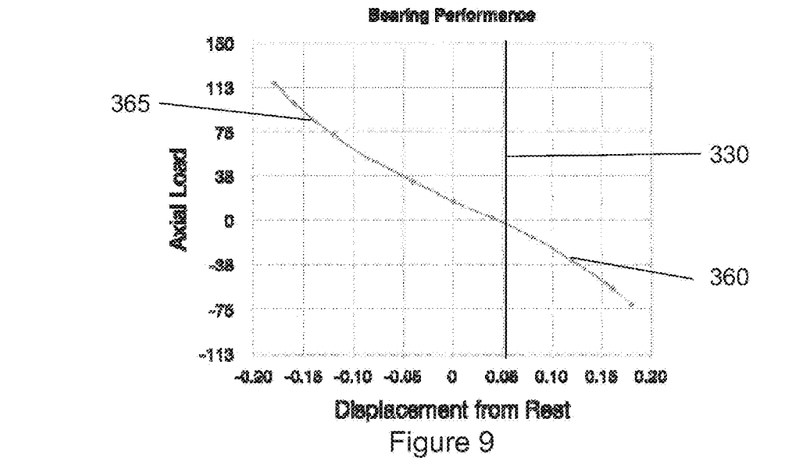
FIG. 9 is a graph that illustrates the displacement from rest based upon an axial load applied to a shaft of the magnetic suspension assembly shown in FIG. 8.

FIG. 9 is a graph that illustrates the displacement from rest based upon an axial load applied to the shaft 305. Line 330 illustrates the shaft 305 at rest when no axial load is applied to the shaft 305. As illustrated in the graph, the shaft 305 is centralized in a stable balanced system with 0 axial load and 0.05 inches of displacement in the +X direction. The reason the shaft 305 is centralized at the 0.05 inches of displacement in the +X direction is because the repulsive forces Fa, Fc of the (larger) magnet members 345, 325, respectively, are stronger than the repulsive forces Fb, Fd of the (smaller) magnet members 335, 315, respectively. As also illustrated in the graph, a greater force is required to displace the shaft 305 in the −X direction than +X direction for the same displacement. For example, the shaft having a 0.125 displacement in the −X direction requires an axial force of approximately 75 pounds (see point 365), and the shaft 305 having a 0.125 displacement in the +X direction requires an axial force (in a direction opposite the axial load arrow) of approximately 38 pounds (see point 360). Thus, the magnetic suspension assembly 300 has different performance in the −X direction and +X direction for the same amount of displacement.

Figure 10:
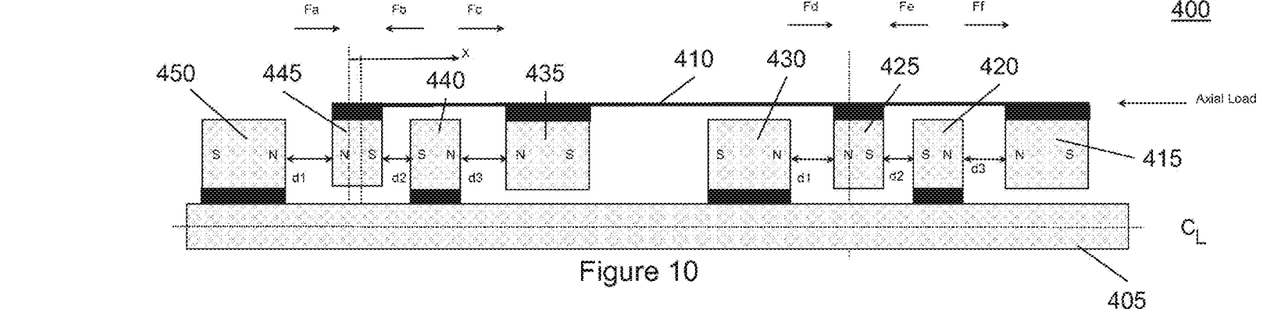
FIG. 10 is a view illustrating a force diagram of a magnetic suspension assembly.

FIG. 10 is a view illustrating a force diagram of a magnetic suspension assembly 400 of the present invention. As shown, the assembly 400 includes a first array of magnet members comprising first, second, third and fourth magnet members 415, 420, 425, 430 on one side of a shaft 405 and a second array of magnet members comprising fifth, sixth, seventh and eighth magnet members 435, 440, 445, 450 on the other side. The shaft 405 is configured to rotate relative to a housing 410. The shaft 405 is radially supported by bearings (not shown) and axially supported by the magnet members 415, 420, 425, 430, 435, 440, 445, 450. As shown, the magnet members 415, 425, 435 and 445 are attached to the housing 410 and the magnet members 420, 430, 440, 450 are attached to the shaft 405. In another embodiment, the magnet members 415, 425, 435 and 445 are attached to the shaft 405 and the magnet members 420, 430, 440, 450 are attached to the housing 410.

The magnet members are symmetric and may be arranged to have both attractive forces and repulsive forces. The forces will be explained in relation to the first magnetic array consisting of the first, second, third and fourth magnet members 415, 420, 425, 430. It is to be understood the forces on the second magnetic array consisting of the fifth, sixth, seventh and eighth magnet members 435, 440, 445, 450 will be the same. As shown, forces Fd, Fe and Ff are repulsive forces because adjacent magnet members have the same polarity (e.g., N/N or S/S). In addition to the respective polarities, the first magnet member 415 and the fourth magnet member 430 are larger than the second magnet member 420 and the third magnet member 435, which results in unequal forces between the magnet members.

Figure 11:
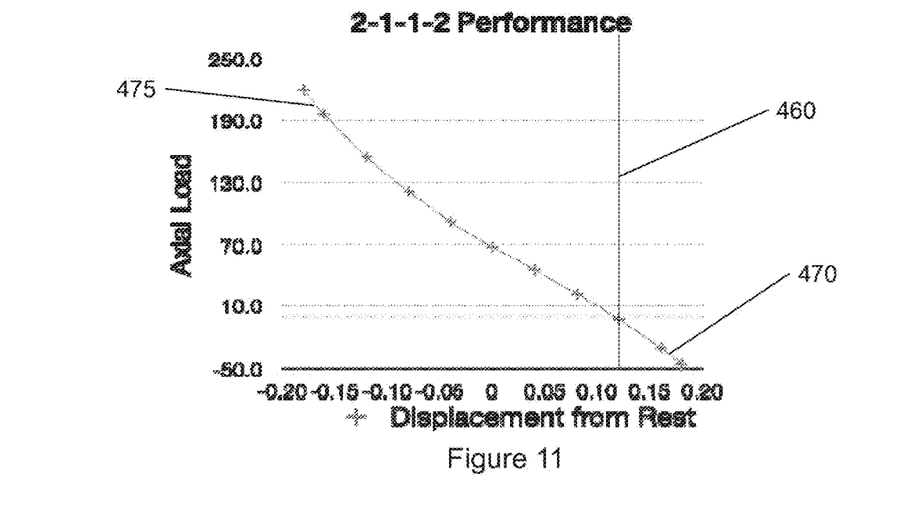
FIG. 11 is a graph that illustrates the displacement from rest based upon an axial load applied to a shaft of the magnetic suspension assembly shown in FIG. 10.

FIG. 11 is a graph that illustrates the displacement from rest based upon an axial load applied to the shaft 405. Line 460 illustrates the shaft 405 at rest when no axial load is applied to the shaft 405. As illustrated in the graph, the shaft 405 is displaced approximately 0.12 inches in the +X direction when the shaft is in a stable balanced system with 0 axial load. The reason the shaft 405 is centralized at the 0.12 inches in the +X direction is because the repulsive force Fd and the attractive forces Ff are greater than the repulsive force Fe. As also illustrated in the graph, a greater force is required to displace the shaft 405 in the −X direction than +X direction for the same displacement. For example, the shaft having a 0.17 displacement in the −X direction requires an axial force of approximately 200 pounds (see point 475), and the shaft 405 having a 0.17 displacement in the +X direction requires an axial force (in a direction opposite the axial load arrow) of approximately 30 pounds (see point 470). Thus, the magnetic suspension assembly 400 has different displacement performance in the −X direction and +X direction for the same amount of displacement.

In some applications, the restriction of space for magnetic material and the specific load requirements will only be met by increasing the number of magnetic elements in the suspension system. FIGS. 10 and 11 show a mathematical model for a magnetic suspension assembly 400 with 4 magnetic masses (on each side), sized and spaced to create a large asymmetrical load-bearing for an application where there is insufficient space for a single large magnet member. In the example, magnet members of 2× strength are used as outer members of asymmetrical arrays (e.g., the first array and the second array). The resulting performance gives a load response greater than 4:1 in the axial direction.

Figure 12:
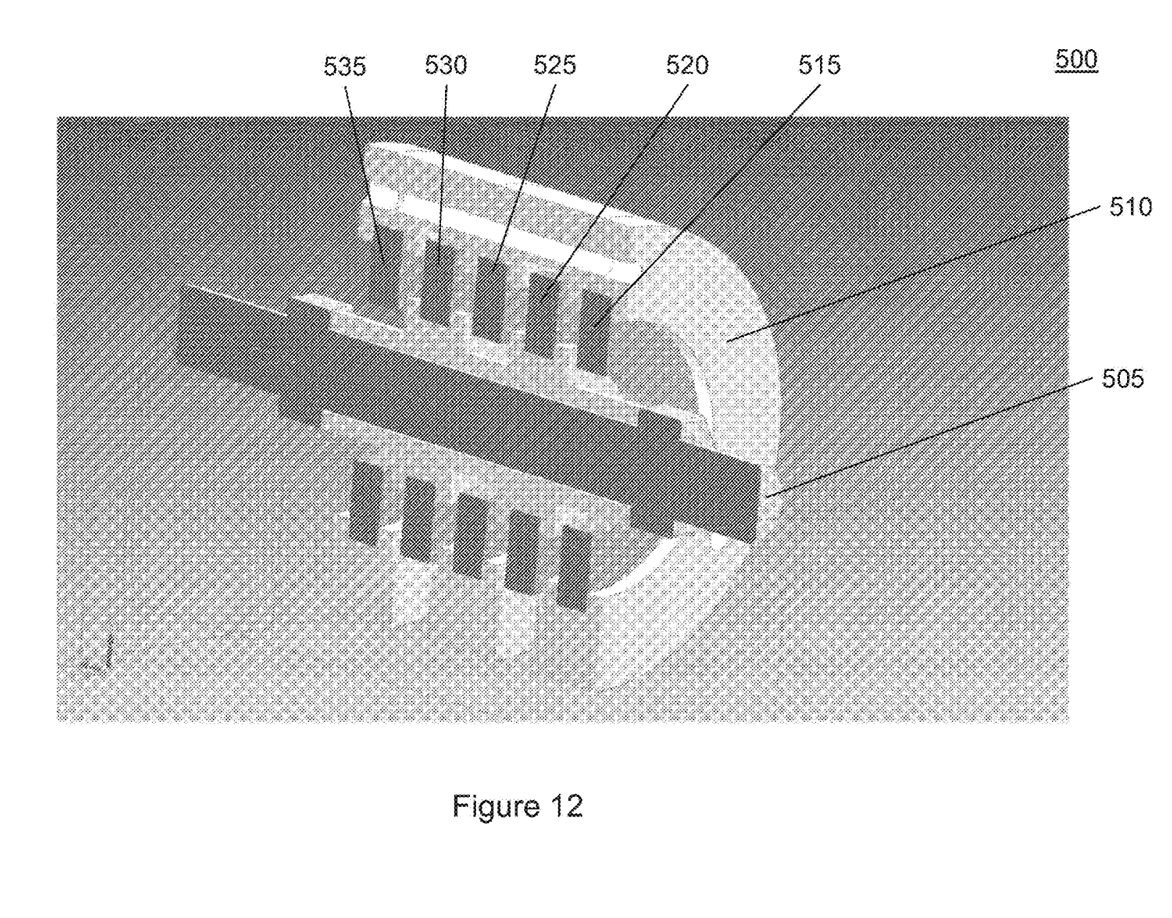
FIG. 12 is a view illustrating a magnetic suspension assembly.

FIG. 12 is a view illustrating a magnetic suspension assembly 500 of the present invention. The assembly 500 includes a shaft 505 disposed within a housing 510. Similar to other embodiments, the shaft 505 is configured to rotate relative to the housing 510. The shaft 505 is radially supported by bearings (not shown) and axially supported by a symmetric array of magnet members 515, 520, 525, 530, 535. As shown, the magnet members are arranged in an alternating manner such that adjacent magnet members are attached to the housing 510 (or the shaft 505). For instance, magnet member 515 is attached to the housing 515 and adjacent magnet member 520 is attached to the shaft 505 and so forth. Additionally, the magnet members 515, 520, 525, 530, 535 are equally spaced relative to each other and the magnet members 515, 520, 525, 530, 535 have the same size. In one embodiment, the adjacent magnet members are arranged to have the same polarity such that the shaft 505 is centralized in the housing 510 (similar to FIG. 3). In another embodiment, the adjacent magnet members are arranged to have the opposite polarity such that the shaft 505 is offset to one side of the housing 510 (similar to FIG. 6). In a further embodiment, the adjacent magnet members are arranged to have alternating polarity. In other words, magnetic directions, strength and spacing would be chosen to yield the desired response of the shaft.

In one embodiment, a magnetic suspension system for supporting a shaft in a housing is provided. The magnetic suspension system includes an array of magnet members disposed between the shaft and the housing. The array of magnet members comprising a first magnet member, a second magnet member, and a third magnet member, wherein the first magnet member and the second magnet member generate a first force that is substantially parallel to a longitudinal axis of the shaft and the second magnet member and the third magnet member generate a second force that is substantially parallel with the longitudinal axis of the shaft The first force and the second force are configured to position the shaft axially within the housing.

In another embodiment, a method of supporting a shaft along a longitudinal axis of a housing is provided. The method includes the step of selecting an axial position of the shaft within the housing. The method further includes the step of selecting an array of magnet members based upon the selected axial position. Additionally, the method includes the step of positioning the array of magnet members between the shaft and the housing such that a first force and a second force are generated in the array of magnet members which is configured to position the shaft at the axial position within the housing.

In another embodiment, a suspension system for supporting a shaft in a housing is provided. The system includes a first array of magnet members disposed between the shaft and the housing at one end of the shaft. The system further includes a second array of magnet members disposed between the shaft and the housing at another end of the shaft, wherein the first array of magnet member generates first and second forces and the second array of magnet members generates third and fourth forces and wherein the forces are configured to position the shaft axially within the housing.

While the foregoing is directed to embodiments of the present invention, other and further embodiments of the invention may be devised without departing from the basic scope thereof, and the scope thereof is determined by the claims that follow.

The invention claimed is:

1. An asymmetric axial magnetic suspension system for supporting a shaft in a housing, the system comprising:
a first array of magnet members axially disposed between the shaft and the housing, the first array of magnet members comprising a first magnet member, a second magnet member, and a third magnet member,
wherein the first magnet member and the second magnet member generate a first force that is substantially parallel to a longitudinal axis of the shaft and the second magnet member and the third magnet member generate a second force that is substantially parallel with the longitudinal axis of the shaft, and
wherein the second magnet member is asymmetrically axially offset between the first and third magnet members,
wherein the asymmetric axial offset is created by the first magnet being stronger than the third magnet,
a second array of magnet members disposed between the shaft and the housing, the second array of magnet members comprising a fourth magnet member, a fifth magnet member, and a sixth magnet member,
wherein the fourth magnet member and the fifth magnet member generate a third force that is substantially parallel to the longitudinal axis of the shaft and the fifth magnet member and the sixth magnet member generate a fourth force that is substantially parallel with the longitudinal axis of the shaft,
wherein the fourth magnet is stronger than the sixth magnet.

2. The asymmetric magnetic suspension system of claim 1, wherein the asymmetric offset is created by the first magnet being further from the second magnet than the third magnet is from the second magnet.

3. The asymmetric magnetic suspension system of claim 1, wherein a first maximum displacement force that the suspension system can handle in a first direction along the longitudinal axis of the shaft is greater than a maximum displacement force that the suspension can accept in a second direction opposite the first direction along the longitudinal shaft.

4. The asymmetric magnetic suspension system of claim 1, wherein the fourth magnet is positioned further from the fifth magnet than the sixth magnet is from the fifth magnet.

5. An asymmetric axial magnetic suspension system for supporting a shaft in a housing, the system comprising:
a first array of magnet members axially disposed between the shaft and the housing, the first array of magnet members comprising a first magnet member, a second magnet member, and a third magnet member,
wherein the first magnet member and the second magnet member generate a first force that is substantially parallel to a longitudinal axis of the shaft and the second magnet member and the third magnet member generate a second force that is substantially parallel with the longitudinal axis of the shaft, and
wherein a first maximum force between the first and second magnet members is different than a second maximum force between the second and third magnet members,
wherein the first magnet is stronger than the third magnet,
a second array of axial magnet members disposed between the shaft and the housing, the second array of magnet members comprising a fourth magnet member, a fifth magnet member, and a sixth magnet member,
wherein the fourth magnet member and the fifth magnet member generate a third force that is substantially parallel to the longitudinal axis of the shaft and the fifth magnet member and the sixth magnet member generate a fourth force that is substantially parallel with the longitudinal axis of the shaft,
wherein the fourth magnet is stronger than the sixth magnet.

6. The asymmetric magnetic suspension system of claim 5, wherein the first magnet is further from the second magnet than the third magnet is from the second magnet.

7. The asymmetric magnetic suspension system of claim 5, wherein the second magnet member is asymmetrically offset between the first and third magnet members.

8. The asymmetric magnetic suspension system of claim 5, wherein the first and second forces are not equal.

9. The asymmetric magnetic suspension system of claim 5, wherein the fourth magnet is positioned further from the fifth magnet than the sixth magnet is from the fifth magnet.

10. The asymmetric magnetic suspension system of claim 5, wherein the third and fourth forces are not equal.

11. The asymmetric magnetic suspension system of claim 5, wherein the first and second arrays each include more than three magnet members.

12. The asymmetric magnetic suspension system of claim 5, wherein a first density of the first magnet member is different than a second density of the second magnet member.

13. The asymmetric magnetic suspension system of claim 5, wherein a density of the first magnet member is different than a second density of the third magnet member, and a third density of the fourth magnet member is different than a fourth density of the sixth magnet member.

* * * * *